United States Patent
Fujishima (10) Patent No.: US 10,348,917 B2
(45) Date of Patent: Jul. 9, 2019

(54) IMAGE READING APPARATUS AND IMAGE FORMING APPARATUS HAVING PIVOTABLE COVER MEMBER WITH OPPOSING WALL AND SIDE WALL

(71) Applicant: KONICA MINOLTA, INC., Chiyoda-ku, Tokyo (JP)

(72) Inventor: Tatsumi Fujishima, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/873,328

(22) Filed: Jan. 17, 2018

(65) Prior Publication Data
US 2018/0227438 A1   Aug. 9, 2018

(30) Foreign Application Priority Data
Feb. 6, 2017   (JP) .................................. 2017-019568

(51) Int. Cl.
*H04N 1/04*   (2006.01)
*H04N 1/00*   (2006.01)

(52) U.S. Cl.
CPC ....... *H04N 1/0053* (2013.01); *H04N 1/00546* (2013.01); *H04N 1/00551* (2013.01); *H04N 1/00909* (2013.01); *H04N 1/00013* (2013.01); *H04N 1/0057* (2013.01)

(58) Field of Classification Search
CPC .................................................. H04N 1/0053
See application file for complete search history.

(56) References Cited

U.S. PATENT DOCUMENTS

| | | | | |
|---|---|---|---|---|
| 6,612,561 B2* | 9/2003 | Sekine | ............... | H04N 1/00519 271/145 |
| 8,509,672 B2* | 8/2013 | Kozaki | ............... | H04N 1/0053 271/264 |
| 8,610,975 B2* | 12/2013 | Osakabe | ............ | H04N 1/00538 358/474 |
| 2010/0221031 A1* | 9/2010 | Ishio | .................. | G03G 15/6552 399/82 |
| 2013/0063751 A1* | 3/2013 | Miura | ................ | H04N 1/00527 358/1.13 |

(Continued)

FOREIGN PATENT DOCUMENTS

JP   2015-098371 A   5/2015
JP   2015098371 A   *   5/2015

*Primary Examiner* — Dung D Tran
(74) *Attorney, Agent, or Firm* — Buchanan Ingersoll & Rooney PC (57) ABSTRACT

An image reading apparatus includes: an image reader that reads an image of a document; a document conveying apparatus including a housing internally including a conveyance path that conveys the document, and a supply tray designed to supply the document to the conveyance path, and a discharge tray designed to receive the document; and a cover member that covers the supply tray and the discharge tray, wherein in a case where a direction orthogonal to a first direction along a document discharge direction and orthogonal to the up-down direction in the discharge tray is defined as a second direction, the cover member includes an opposing wall opposed to one end of the supply tray and one end of the discharge tray, and an upper wall connected to an upper part of the opposing wall and designed to cover a zone above the supply tray and the discharge tray.

5 Claims, 5 Drawing Sheets

(56) References Cited

U.S. PATENT DOCUMENTS

2014/0071469 A1* 3/2014 Ishikawa ............ H04N 1/00519
　　　　　　　　　　　　　　　　　　　　　358/1.12
2015/0304513 A1* 10/2015 Tu ..................... H04N 1/00557
　　　　　　　　　　　　　　　　　　　　　358/1.13
2016/0083214 A1* 3/2016 Murodate ............ H04N 1/0053
　　　　　　　　　　　　　　　　　　　　　271/207

* cited by examiner

IMAGE READING APPARATUS AND IMAGE FORMING APPARATUS HAVING PIVOTABLE COVER MEMBER WITH OPPOSING WALL AND SIDE WALL

The entire disclosure of Japanese patent Application No. 2017-019568, filed on Feb. 6, 2017, is incorporated herein by reference in its entirety.

BACKGROUND

Technological Field

The present invention relates to an image reading apparatus and an image forming apparatus including a document conveying apparatus.

Description of the Related Art

For example, JP 2015-98371 A is included in the documents disclosing a conventional image forming apparatus.

The image forming apparatus disclosed in JP 2015-98371 A includes a tray cover provided to prevent entry of dust to the inside of the document conveying apparatus from an opening such as a sheet supply port and a sheet discharge port. The tray cover is provided so as to be openable and closable, covering the sheet supply port in a closed state and constituting a portion of the sheet supply tray in an open state.

In the image forming apparatus disclosed JP 2015-98371 A, however, the tray cover is pivotably provided about an axis having a front-rear direction as an axial direction in a front view, that is, viewed from the side where an operation panel is arranged.

To achieve this configuration, there provided a wall that holds the pivot axis on each of both end sides of the image forming apparatus in the above-described front-rear direction. This configuration limits an extraction direction of a discharged document to a sheet discharge direction, disabling extraction of the document from the front side. This also makes it difficult to set the document on the sheet supply tray from the front side in some cases. As a result, convenience would be reduced.

SUMMARY

The present invention has been made in view of the above-described problem, and an object of the present invention is to provide an image reading apparatus and an image forming apparatus capable of enhancing convenience while suppressing entry of foreign matter to the inside the document conveying apparatus.

To achieve the abovementioned object, according to an aspect of the present invention, an image reading apparatus reflecting one aspect of the present invention comprises: an image reader that reads an image of a document; a document conveying apparatus including a housing internally including a conveyance path that conveys the document such that the document passes through a reading position in which the image of the document is read by the image reader, and a supply tray provided outside the housing and designed to supply the document to the conveyance path, and a discharge tray provided outside the housing so as to be stacked with the supply tray in an up-down direction and designed to receive the document discharged from the conveyance path; and a cover member that covers the supply tray and the discharge tray so as to be switchable between a covered state of covering the supply tray and the discharge tray, and an uncovered state of covering neither the supply tray nor the discharge tray, wherein in a case where a direction orthogonal to a first direction along a document discharge direction and orthogonal to the up-down direction in the discharge tray is defined as a second direction, the cover member at least includes, in the covered state, an opposing wall opposed to one end of the supply tray and one end of the discharge tray positioned in the second direction, and an upper wall connected to an upper part of the opposing wall and designed to cover a zone above the supply tray and the discharge tray.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described in detail with reference to the drawings. However, the scope of the invention is not limited to the disclosed embodiments. In the following embodiments, the same or common portions are denoted by same reference numerals in the drawings, and description thereof will not be repeated.

(First Embodiment)

Figure 1:
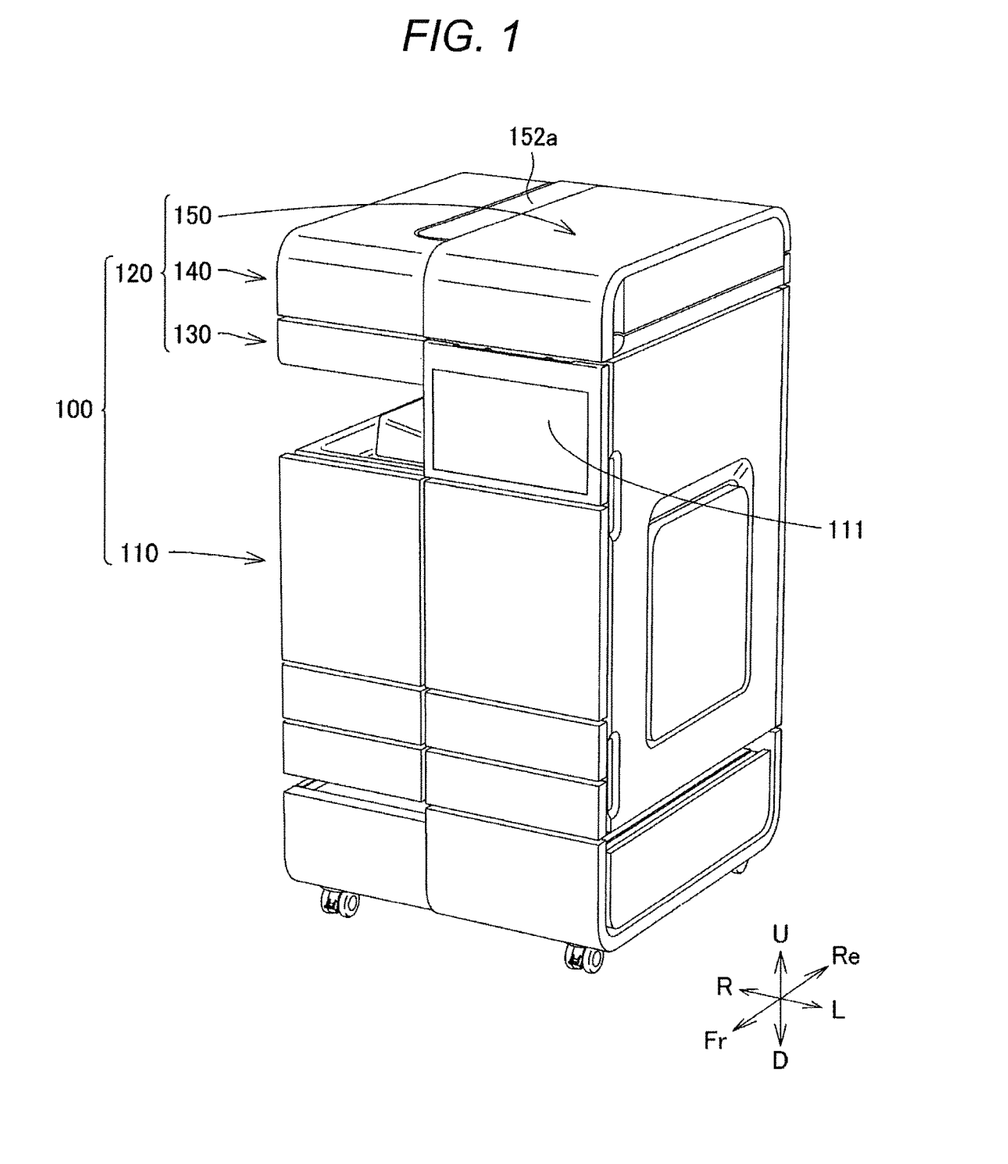
FIG. 1 is a perspective view illustrating a state in which a cover member is closed in an image forming apparatus according to a first embodiment.
Figure 2:
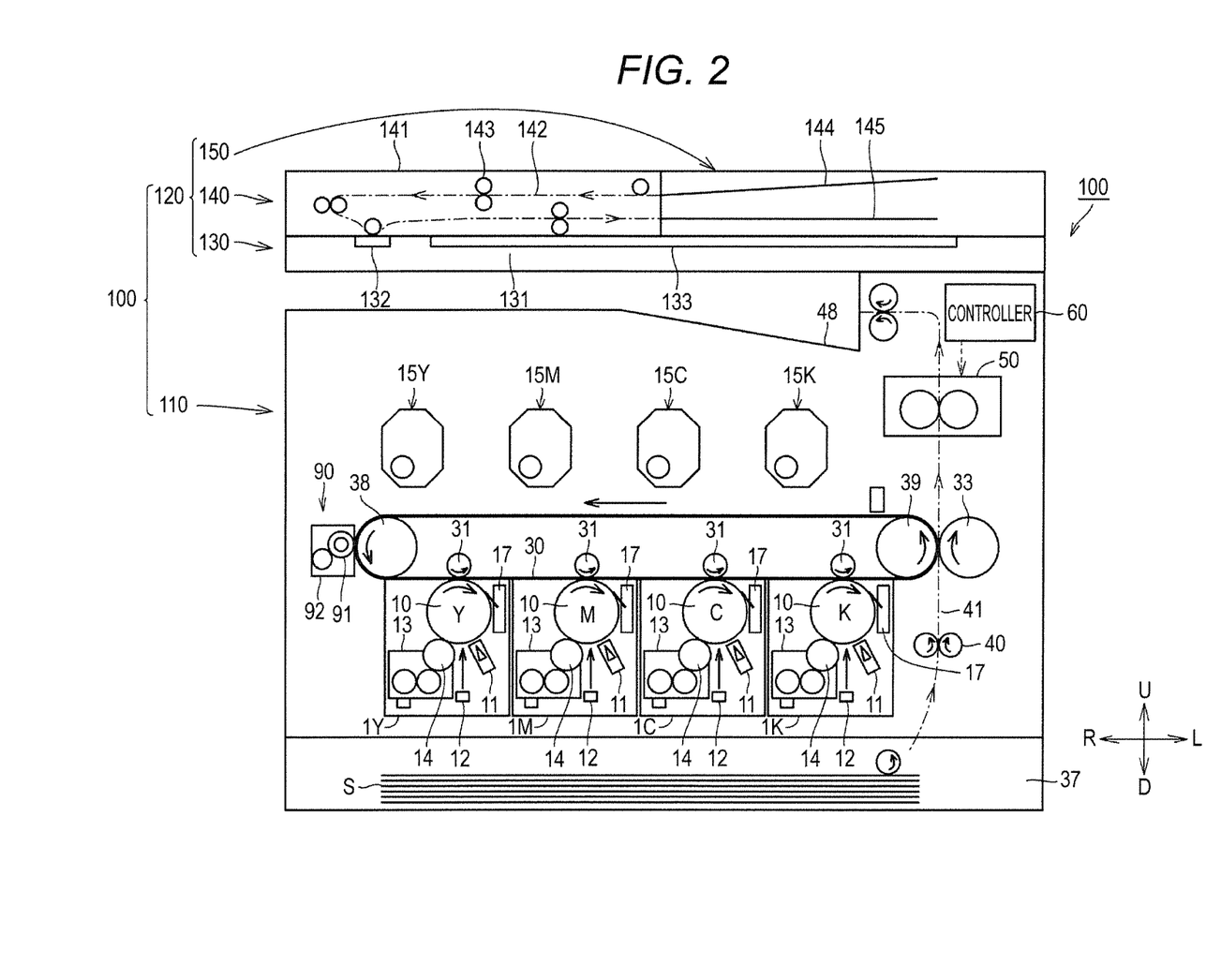
FIG. 2 is a schematic diagram illustrating a configuration of the image forming apparatus according to the first embodiment.
Figure 3:
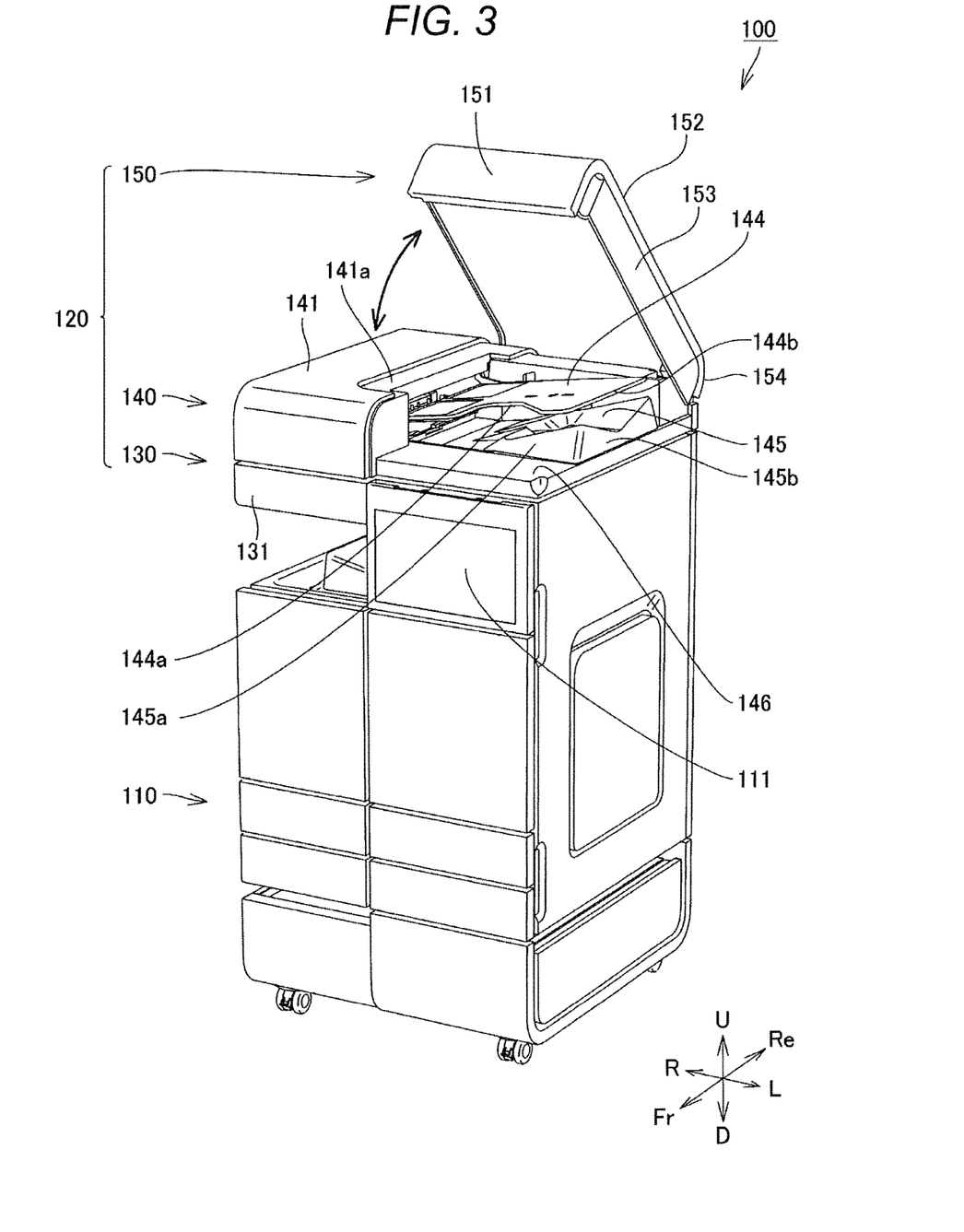
FIG. 3 is a perspective view illustrating a state in which the cover member is open in the image forming apparatus according to the first embodiment.

FIG. 1 is a perspective view illustrating a state in which a cover member is closed in an image forming apparatus according to a first embodiment. FIG. 2 is a schematic diagram illustrating a configuration of the image forming apparatus according to the first embodiment. FIG. 3 is a perspective view illustrating a state in which the cover member is open in the image forming apparatus according to the first embodiment. An image forming apparatus 100 according to the first embodiment will be described with reference to FIGS. 1 to 3.

In FIGS. 1 to 3, a direction indicated by arrows U and D is an up-down direction, a direction indicated by arrows L and R is a left-right direction of the image forming apparatus 100, and a direction indicated by arrows Fr and Re is a front-rear direction of the image forming apparatus 100. The representation of the arrows also applies to FIGS. 4 and 5.

As illustrated in FIG. 1, the image forming apparatus 100 mainly includes an image forming part 110 that forms an image, and an image reading apparatus 120 that reads an image of a document. The image forming part 110 constitutes a lower side of the image forming apparatus 100, while the image reading apparatus 120 constitutes an upper side of the image forming apparatus 100.

The image reading apparatus 120 includes an image reader 130, a document conveying apparatus 140, and a cover member 150. The document conveying apparatus 140 is pivotably held on a document reading table 131 of the image reader 130. The cover member 150 is pivotably held by the document conveying apparatus 140. The document conveying apparatus 140 and the cover member 150 pivot about a pivot axis arranged along a document discharge direction in a discharge tray 145 (refer to FIG. 3) described below. The pivot axis of the document conveying apparatus 140 and the pivot axis of the cover member 150 are positioned at mutually different positions. The detailed configuration of the image reading apparatus 120 will be described below.

The image forming apparatus 100 has a substantially rectangular parallelepiped shape in a state where the document conveying apparatus 140 and the cover member 150 are closed. The image forming apparatus 100 includes a notch in which a portion of the front surface and right side surface is cut out in the middle of the up-down direction. A tray 48 (refer to FIG. 2) described below is arranged in the notch, and a recording medium on which an image formed by the image forming part 110 is printed is discharged onto the tray 48.

The image forming part 110 forms an image of a document read by the image reading apparatus 120. The image forming part 110 includes an operation panel 111. The operation panel 111 constitutes a portion of the front surface of the image forming apparatus 100. The operation panel 111 is constituted with a display part integrated with a touch sensor. The operation panel 111 inputs information input by the touch sensor into a controller 60 (refer to FIG. 2) described below.

As illustrated in FIG. 2, the image forming part 110 includes image forming units 1Y, 1M, 1C, and 1K, an intermediate transfer belt 30, a primary transfer roller 31, a secondary transfer roller 33, a cassette 37, a driven roller 38, a driving roller 39, a timing roller 40, a fixing apparatus 50, the controller 60, and a cleaning apparatus 90.

The image forming units 1Y, 1M, 1C, and 1K are arranged in this order along the intermediate transfer belt 30. The image forming unit 1Y receives toner supplied from the toner bottle 15Y and forms a yellow (Y) toner image. The image forming unit 1M receives toner supplied from the toner bottle 15M and forms a magenta (M) toner image. The image forming unit 1C receives toner supplied from the toner bottle 15C and forms a cyan (C) toner image. The image forming unit 1K receives a toner supplied from the toner bottle 15K and forms a black (BK) toner image.

Each of the image forming units 1Y, 1M, 1C, and 1K includes a photoreceptor 10, a charging apparatus 11, an exposure apparatus 12, a developing apparatus 13, and a cleaning apparatus 17.

The charging apparatus 11 uniformly charges a surface of the photoreceptor 10. The exposure apparatus 12 emits a laser beam onto the photoreceptor 10 in accordance with a control signal from the controller 60 and exposes the surface of the photoreceptor 10 in accordance with an input image pattern. With this procedure, an electrostatic latent image corresponding to an input image is formed on the photoreceptor 10.

The developing apparatus 13 applies a developing bias to the developing roller 14 while rotating the developing roller 14, and allows the toner to adhere to the surface of the developing roller 14. This allows the toner to be transferred from the developing roller 14 to the photoreceptor 10, and a toner image corresponding to the electrostatic latent image is developed on the surface of the photoreceptor 10.

The photoreceptor 10 and the intermediate transfer belt 30 are in contact with each other at a portion in which the primary transfer roller 31 is provided. The primary transfer roller 31 has a roller shape and is rotatable. With application of a transfer voltage having a polarity opposite to the polarity of the toner image to the primary transfer roller 31, the toner image is transferred from the photoreceptor 10 to the intermediate transfer belt 30.

At this time, toner images of yellow (Y), magenta (M), cyan (C), and black (BK) are sequentially superposed in this order and transferred to the intermediate transfer belt 30 from the photoreceptor 10. With this procedure, a colored toner image is formed on the intermediate transfer belt 30.

The intermediate transfer belt 30 is stretched by a driven roller 38 and a driving roller 39. The driving roller 39 is rotationally driven by a motor (not illustrated), for example. The intermediate transfer belt 30 and the driven roller 38 rotate in conjunction with the driving roller 39. With this configuration, the toner image on the intermediate transfer belt 30 is conveyed to the secondary transfer roller 33.

The cleaning apparatus 17 is in pressure contact with the photoreceptor 10. The cleaning apparatus 17 collects the toner remaining on the surface of the photoreceptor 10 after transfer of the toner image.

A sheet S is set in the cassette 37. The sheet S is transferred one by one from the cassette 37 to the secondary transfer roller 33 along the conveyance path 41 by the timing roller 40.

The secondary transfer roller 33 has a roller shape and is rotatable. The secondary transfer roller 33 applies a transfer voltage having a polarity opposite to the polarity of the toner image to the sheet S being conveyed. This operation attracts the toner image from the intermediate transfer belt 30 to the secondary transfer roller 33, allowing the toner image on the intermediate transfer belt 30 to be transferred.

Meanwhile, residual toner on the intermediate transfer belt 30 is removed by the cleaning apparatus 90. The cleaning apparatus 90 includes a transfer belt cleaner 91 and a waste toner box 92. The above-described residual toner is collected by the transfer belt cleaner 91 and stored in the waste toner box 92.

The timing of conveying the sheet S to the secondary transfer roller 33 is adjusted by the timing roller 40 in accordance with the position of the toner image on the intermediate transfer belt 30. With the timing roller 40, the toner image on the intermediate transfer belt 30 is transferred to an appropriate position on the sheet S.

The fixing apparatus 50 pressurizes and heats the sheet S passing therethrough. As a result, the toner image is fixed on the sheet S. Thereafter, the sheet S is discharged onto the tray 48.

As illustrated in FIGS. 2 and 3, the document reading table 131 includes, on its upper surface, document reading regions 132 and 133. An image of the document conveyed by the document conveying apparatus 140 is read in the document reading region 132. An image of the document mounted on the document reading table 131 is read in the document reading region 133.

The document conveying apparatus 140 includes a housing 141 internally including a conveyance path 142, a plurality of conveyance rollers 143, a supply tray 144, the discharge tray 145, and a document pressing part 146.

The housing 141 constitutes a right side part of the document conveying apparatus 140. The housing 141 includes a mounting zone 141*a* on which a portion of an upper wall 152 of a cover member 150 described below can be mounted. The mounting zone 141a is formed by a partial recess on an upper surface of the housing 141.

The conveyance path 142 inside the housing 141 is provided to convey the document so as to pass through a reading position (document reading region 132) where an image of the document is read by the image reader 130. The conveyance path 142 is provided so as to allow the document supplied from the supply tray 144 to be discharged to the discharge tray 145 via the document reading region 132.

Moreover, the plurality of conveyance rollers 143 is arranged inside the housing 141 along the conveyance path 142.

The supply tray 144 and the discharge tray 145 constitute a left side part of the document conveying apparatus 140. The supply tray 144 and the discharge tray 145 are provided outside the housing 141.

The supply tray 144 is a tray for supplying a document to the conveyance path 142. The discharge tray 145 receives the document discharged from the conveyance path 142. The discharge tray 145 is provided so as to be stacked with the supply tray 144 in the up-down direction. Specifically, the discharge tray 145 is positioned below the supply tray 144.

The document pressing part 146 constitutes a lower part of the document conveying apparatus 140. The document pressing part 146 has a plate shape. The document pressing part 146 presses the document mounted on the document reading table 131 from the upper side.

The document pressing part 146 is pivotably attached to the document reading table 131 by a hinge part (not illustrated). The hinge part (not illustrated) includes a pivot axis parallel to a direction (first direction) along a document discharge direction in the discharge tray 145. In the present embodiment, the discharge direction is substantially parallel to the left-right direction of the image forming apparatus 100.

In a second direction perpendicular to the above-described first direction and to the up-down direction, the document pressing part 146 is pivotably attached to an end of the image reader 121 positioned on the side opposite to one end 144a side of the supply tray 144 and to one end 145a side of the discharge tray 145. More specifically, the document pressing part 146 is pivotably attached to a rear part of the document reading table 131.

With the document pressing part 146 pivoting about the pivot axis of the above-described hinge part, the document conveying apparatus 140 entirely pivots with respect to the image reader 130.

The cover member 150 covers the supply tray 144 and the discharge tray 145 so as to be switchable between a covered state of covering the supply tray 144 and the discharge tray 145 and an uncovered state of covering neither the supply tray 144 nor the discharge tray 145.

The color of the cover member 150A and the color of the document conveying apparatus 140 (more specifically, the housing 141) may be the same or mutually different. When the color of the cover member 150A is different from the color of the document conveying apparatus 140A, the cover member 150A and the document conveying apparatus 140 are distinguishable from each other.

The cover member 150 includes at least an opposing wall 151 and an upper wall 152. Specifically, the cover member 150 includes an opposing wall 151, an upper wall 152, a side wall 153, and an attachment part 154.

The opposing wall 151 is opposed to one end 144a of the supply tray 144 and one end 145a of the discharge tray 145 positioned in the above-described second direction in a covered state in which the cover member 150 covers the supply tray 144 and the discharge tray 145. That is, the opposing wall 151 is opposed to a front end of the supply tray 144 and a front end of the discharge tray 145 in the above-described covered state. The opposing wall 151 constitutes a front side part of the cover member 150 in the above-described covered state.

The upper wall 152 is connected to an upper part of the opposing wall 151. The upper wall 152 covers a zone above the supply tray 144 and the discharge tray 145 in the above-described covered state. The upper wall 152 constitutes an upper part of the cover member 150 in the above-described covered state. An upper surface of the upper wall 152 is flat. In the above-described covered state, the upper surface of the upper wall 152 is substantially parallel to a horizontal surface.

This configuration enables, in the covered state, mounting electronic devices such as a tablet terminal, a portable terminal apparatus, and a mobile computer, and mounting documents, or the like, on the upper surface of the upper wall 152. In this case, it is possible to invite a plurality of persons around the image forming apparatus 100 and perform a meeting, or the like, using the electronic devices or documents mounted on the image forming apparatus 100.

The upper wall 152 includes a protrusion 152a (refer to FIG. 1) protruding toward the side where the housing 141 is positioned in a direction (first direction) along the document discharge direction in the discharge tray 145. The protrusion 152a has a shape corresponding to the mounting zone 141a provided in the housing 141 of the document conveying apparatus 140.

In the above-described covered state, the protrusion 152a is mounted on the mounting zone 141a provided in the housing 141 of the document conveying apparatus 140. In a state where the protrusion 152a is mounted on the mounting zone 141a, the upper surface of the upper wall 152 and the upper surface of the housing 141 are positioned on a same plane.

This configuration enables the upper surface of the upper wall 152 and the upper surface of the housing 141 to be used as a wide surface, and enables electronic devices such as a tablet terminal, a portable terminal apparatus, and a mobile computer, and documents to be arranged further stably. Moreover, since this configuration increases the mounting space, and enables inviting more people around the image forming apparatus 100, making it possible to also perform a meeting, or the like, with a larger number of people.

In the above-described covered state, the side wall 153 is opposed to one end 144b of the supply tray 144 and one end 145b of the discharge tray 145 positioned on the side farther from the housing 141 in the above-described first direction. That is, the side wall 153 is opposed to a left end of the supply tray 144 and a left end of the discharge tray 145 in the above-described covered state. The side wall 153 constitutes a left side part of the cover member 150. An upper part of the side wall 153 is connected to the upper wall 152.

The attachment part 154 constitutes a rear part of the cover member 150. The attachment part 154 is pivotably attached to an end of the document conveying apparatus 140 positioned on the side opposite to the one end 144a of the supply tray 144 and to the one end 145a of the discharge tray 145 in the above-described second direction. Specifically, the attachment part 154 is pivotably attached to a rear part of the document conveying apparatus 140.

The attachment part 154 is pivotably attached about a pivot axis parallel to the above-described first direction. With the attachment part 154 pivoting about the above-described pivot axis, the cover member 150 pivots with respect to the document conveying apparatus 140. This enables the cover member 150 to be switchable between the covered state of covering the supply tray 144 and the discharge tray 145 and the uncovered state of covering neither the supply tray 144 nor the discharge tray 145.

With the configuration in which the cover member 150 includes the opposing wall 151, the upper wall 152, and the side wall 153 as described above, a space in which the supply tray 144 and the discharge tray 145 are arranged is covered with the cover member 150 in the covered state. As a result, it is possible to suppress entry of foreign matter such as dust to the inside of the document conveying apparatus 140 (more specifically, the inside of the housing 141).

Moreover, in a case where the cover member 150 is pivoted upward so as to be in the uncovered state, a user can access the supply tray 144 and the discharge tray 145 not solely from the one end 144b side of the supply tray 144 and from the one end 145b side of the discharge tray 145 positioned on the side far from the housing 141 in the above-described first direction but also from the one end 144a side of the supply tray 144 and the one end 145a side of the discharge tray 145 in the above-described second direction.

This facilitates mounting of the document onto the supply tray 144 and extraction of the document from the discharge tray 145, enhancing the convenience of the image reading apparatus 120 and the image forming apparatus 100 including the image reading apparatus 120.

As described above, with the image reading apparatus 120 and the image forming apparatus 100 including the image reading apparatus 120 according to the first embodiment, it is possible to enhance the convenience while suppressing entry of foreign matter to the inside of the document conveying apparatus 140.

(Second Embodiment)

Figure 4:
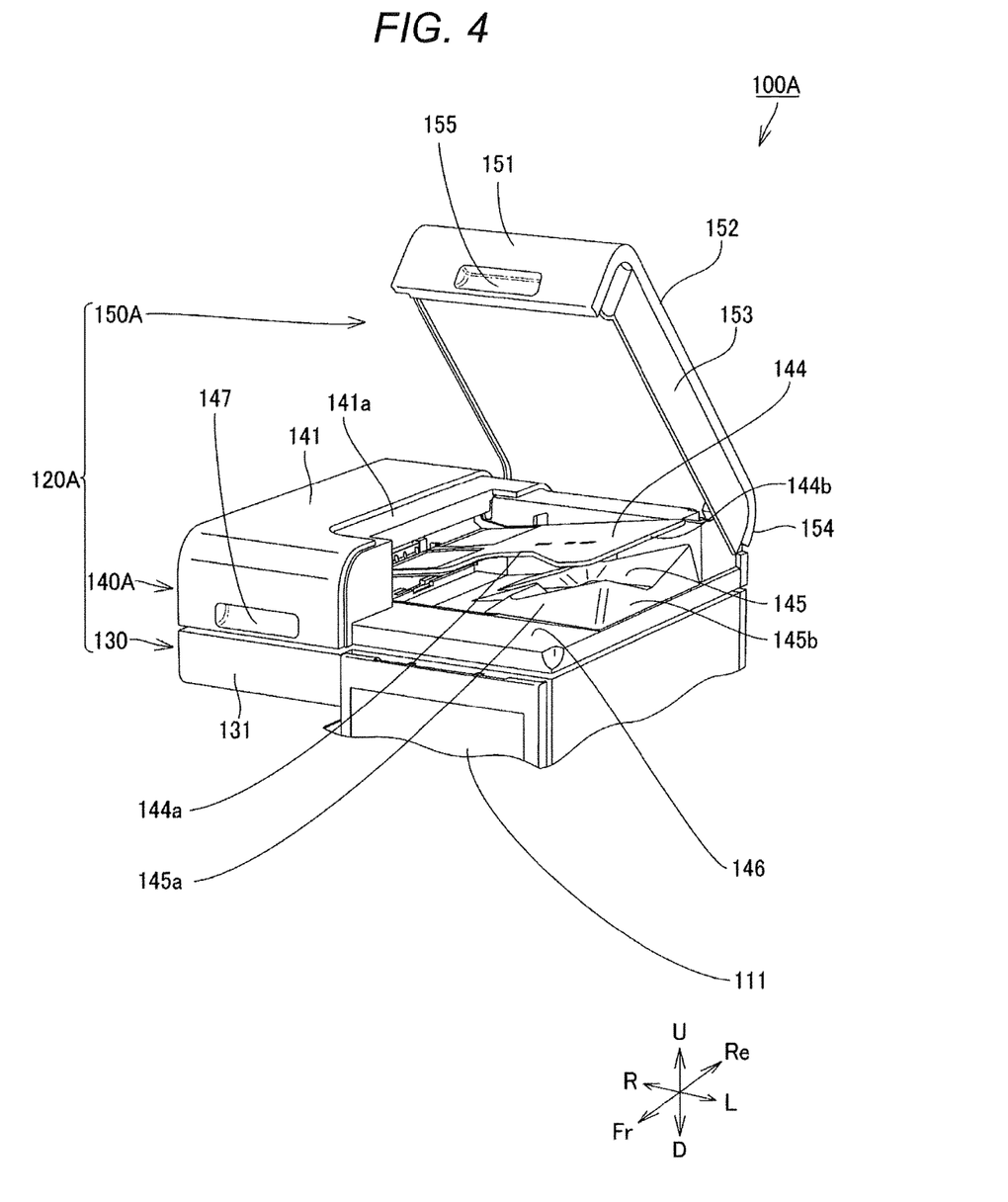
FIG. 4 is a perspective view illustrating a state in which a cover member is open in an image forming apparatus according to a second embodiment.

FIG. 4 is a perspective view illustrating a state in which the cover member is open in the image forming apparatus according to a second embodiment. An image forming apparatus 100A according to the second embodiment will be described with reference to FIG. 4.

As illustrated in FIG. 4, in comparison with the image forming apparatus 100 according to the first embodiment, the image forming apparatus 100A according to the second embodiment includes an image reading apparatus 120A having a different configuration. The other configurations are substantially similar to the case of the first embodiment.

The image reading apparatus 120A according to the second embodiment differs from the image reading apparatus 120 according to the first embodiment in the configuration of a document conveying apparatus 140A and a cover member 150A. Specifically, there are differences in that the housing 141 includes a first handle 147 and that the cover member 150A includes a second handle 155. The other configurations are substantially similar to the case of the first embodiment.

The first handle 147 is formed by a partial recess on the surface of the housing 141. Specifically, the first handle 147 is formed by a partial recess on the front surface of the housing 141.

The first handle 147 is configured as a zone into which a user's fingertip can be inserted. When the user inserts a fingertip into the first handle 147 and lifts the document conveying apparatus 140A, the document conveying apparatus 140A pivots upward.

The second handle 155 is formed by a partial recess on the surface of the cover member 150A. Specifically, the second handle 155 is formed by a partial recess on a front surface of the upper wall 152 of the cover member 150A.

The second handle 155 is configured as a zone into which a user's fingertip can be inserted. When the user inserts a fingertip into the second handle 155 and lifts the document transport apparatus 140A, the document conveying apparatus 140A pivots upward.

Even with the configuration as described above, the image reading apparatus 120A and the image forming apparatus 100A according to the second embodiment achieve effects substantially similar to the case of the image reading apparatus 120 and the image forming apparatus 100 according to the first embodiment.

In addition, with the first handle 147, it is possible to facilitate pivoting of the document conveying apparatus 140A. Moreover, with the above-described second handle 155, it is possible to facilitate pivoting of the cover member 150A.

In addition, since the first handle 147 is provided at a position different from the position of the second handle 155 of the cover member 150A, the user can distinguishably allow pivoting of the cover member 150A the document conveying apparatus 140A. This can suppress the occurrence of a mistake by the user in selecting a pivoting target.

Furthermore, in a case where the color of the cover member 150A is different from the color of the document conveying apparatus 140A, the cover member 150 and the document conveying apparatus 140A can be visually distinguished from each other. This can suppress the occurrence of the mistake by the user in selecting a pivoting target further reliably. An exemplary color of the cover member 150A is white, and an exemplary color of the document conveying apparatus 140A (more specifically, the color of the housing 141) is gray or black.

(Third Embodiment)

Figure 5:
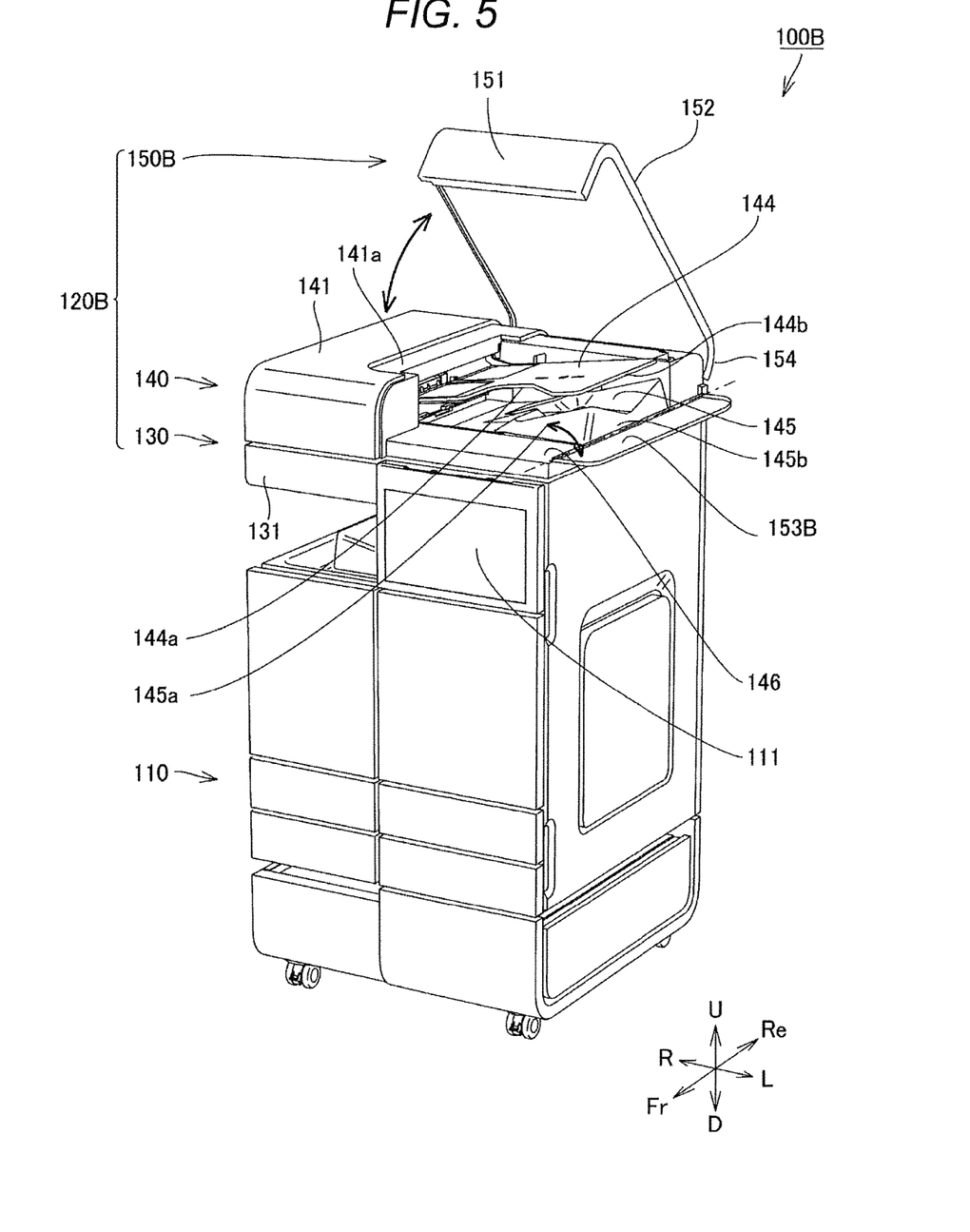
FIG. 5 is a perspective view illustrating a state in which a cover member is open in an image forming apparatus according to a third embodiment.

FIG. 5 is a perspective view illustrating a state in which the cover member is open in the image forming apparatus according to a third embodiment. An image forming apparatus 100B according to the third embodiment will be described with reference to FIG. 5.

As illustrated in FIG. 5, in comparison with the image forming apparatus 100 according to the first embodiment, the image forming apparatus 100B according to the third embodiment includes an image reading apparatus 120B having a different configuration. Specifically, the configuration of a cover member 150B is different. The other configurations are substantially similar to the case of the first embodiment.

The cover member 150B is different from the cover member 150 according to the first embodiment in that a side wall 153B is attached to the document conveying apparatus 140.

The side wall 153B is pivotably provided about an axis having a direction parallel to the second direction perpendicular to the direction (first direction) along the document discharge direction and to the up-down direction in the discharge tray 145, as a pivot axis. The side wall 153B is pivotably attached to the document pressing part 146 by a hinge (not illustrated), for example. The side wall 153B is pivotably attached to one end (left side end) of the document pressing part 146 positioned on the side far from the housing 141 in the above-described first direction.

Even with the configuration as described above, the image reading apparatus 120B and the image forming apparatus 100B according to the third embodiment achieve effects substantially similar to the case of the image reading apparatus 120 and the image forming apparatus 100 according to the first embodiment.

In addition, with the configuration in which the cover member 150B is divided into a main body including the opposing wall 151 and the upper wall 152, and the side wall 153B, it is possible to reduce the weight of the zone pivotable about the axis parallel to the first direction among the cover member 150B, in comparison with the configuration in which the main body is integrated with the side wall 153B. This can reduce the amount of operation force.

Furthermore, as described above, with the side wall 153B being pivotably provided about the axis having the direction parallel to the second direction as the pivot axis, the user can access the supply tray 144 and the discharge tray 145 not merely in the uncovered state in which the upper-lower walls or the like pivot upward but also in the state in which solely the side wall 153B pivots from the covered state.

While the above-described third embodiment is an exemplary case where the side wall 153B is attached to the document conveying apparatus 140, the present invention is not limited to this and the side wall 153B may be attached to the image reader 130 or may be attached to the upper wall 152 of the cover member 150B.

In a case where the side wall 153B is attached to the image reader 130, the side wall 153B is attached to one end (left side end) of the document reading table 131 positioned on the side far from the housing 141 in the above-described first direction in order to avoid interference with the pivot operation of the document conveying apparatus 140.

In a case where the side wall 153B is attached to the upper wall 152, the side wall 153B is attached to one end of the upper wall 152 positioned on the side far from the housing 141 in the above-described first direction. In this case, the pivot axis may be on the upper side or the lower side of the side wall 153B.

While the first to third embodiments described above are exemplary cases where the cover member is pivotably attached to the document conveying apparatus, thereby enabling the covered state and the uncovered state to be switchable, the present invention is not limited to this configuration. It is allowable to configure to enable the above-described covered state and the uncovered state to be switchable by detachably attaching the cover member to the document conveying apparatus.

While the above-described first to third embodiments are exemplary cases where the cover member includes the opposing wall, the upper wall, and the side wall, the present invention is not limited to this configuration, and the side wall may be omitted as long as the opposing wall and the upper wall are provided.

In this case, the supply tray 144 and the discharge tray 145 are also covered by the upper wall in the covered state, it is possible to suppress entry of foreign matter from the upper side to the inside of the document conveying apparatus (more specifically, inside the housing 141). Moreover, with a configuration including the opposing wall, the upper wall is supported by the opposing wall and the upper part of the housing 141 of the document conveying apparatus, enabling the cover member to be stably supported.

Furthermore, omitting the side wall would open the cover member to the side direction (to the left side of the image forming apparatus). This enables the user to access the supply tray 144 and the discharge tray 145 even in the covered state.

Additionally in the uncovered state, this configuration also enables the user to easily access the supply tray 144 and the discharge tray 145 from one end side of the supply tray 144 and one end side of the discharge tray 145 (front side of the image forming apparatus) in the above-described second direction. This facilitates operation from the front side and enhances convenience.

In the case where the cover member is pivotably attached about the axis having the direction parallel to the first direction as the pivot axis, it is possible to facilitate switching between the covered state and the uncovered state in comparison with the case where the cover member is detachably attached to the document conveying apparatus.

Although embodiments of the present invention have been described and illustrated in detail, the disclosed embodiments are made for purposes of illustration and example only and not limitation. The scope of the present invention should be interpreted by terms of the appended claims. The scope of the present invention includes meanings equivalent to claims and all changes within the scope.

What is claimed is:

1. An image reading apparatus comprising:
    an image reader that reads an image of a document;
    a document conveying apparatus including a housing internally including a conveyance path that conveys the document such that the document passes through a reading position in which the image of the document is read by the image reader, and a supply tray provided outside the housing and designed to supply the document to the conveyance path, and a discharge tray provided outside the housing so as to be stacked with the supply tray in an up-down direction and designed to receive the document discharged from the conveyance path; and
    a cover member that covers the supply tray and the discharge tray so as to be switchable between a covered state of covering the supply tray and the discharge tray, and an uncovered state of covering neither the supply tray nor the discharge tray,
    wherein in a case where a direction orthogonal to both a first direction along a document discharge direction and the up-down direction in the discharge tray is defined as a second direction,
    the cover member at least includes, in the covered state, an opposing wall opposed to one end of the supply tray and one end of the discharge tray positioned in the second direction, a side wall opposed to one end of the supply tray and one end of the discharge tray positioned on the side farther from the housing in the first direction, and an upper wall connected to an upper part of the opposing wall and an upper part of the side wall and designed to cover a zone above the supply tray and the discharge tray, and
    the cover member, including the opposing wall, the side wall, and the upper wall, is pivotably attached about an axis having a direction parallel to the first direction as a pivot axis, on an end side of the document conveying apparatus positioned on a side opposite to the one end side of the supply tray and to the one end side of the discharge tray in the second direction.

2. The image reading apparatus according to claim 1,
    wherein the document conveying apparatus is pivotably attached about an axis having a direction parallel to the first direction as a pivot axis, on the end side of the document conveying apparatus positioned on the side opposite to the one end side of the supply tray and to the one end side of the discharge tray in the second direction, the housing includes a first handle that allows pivot operation of the document conveying apparatus, and the cover member includes a second handle that allows pivot operation of the cover member.

3. The image reading apparatus according to claim 1, wherein a color of the housing is different from a color of the cover member.

4. The image reading apparatus according to claim 1, wherein an upper surface of the upper wall of the cover member is flat.

5. An image forming apparatus comprising:

the image reading apparatus according to claim 1; and an image forming part that forms an image of a document read by the image reading apparatus.

\* \* \* \* \*